Patented Jan. 19, 1954

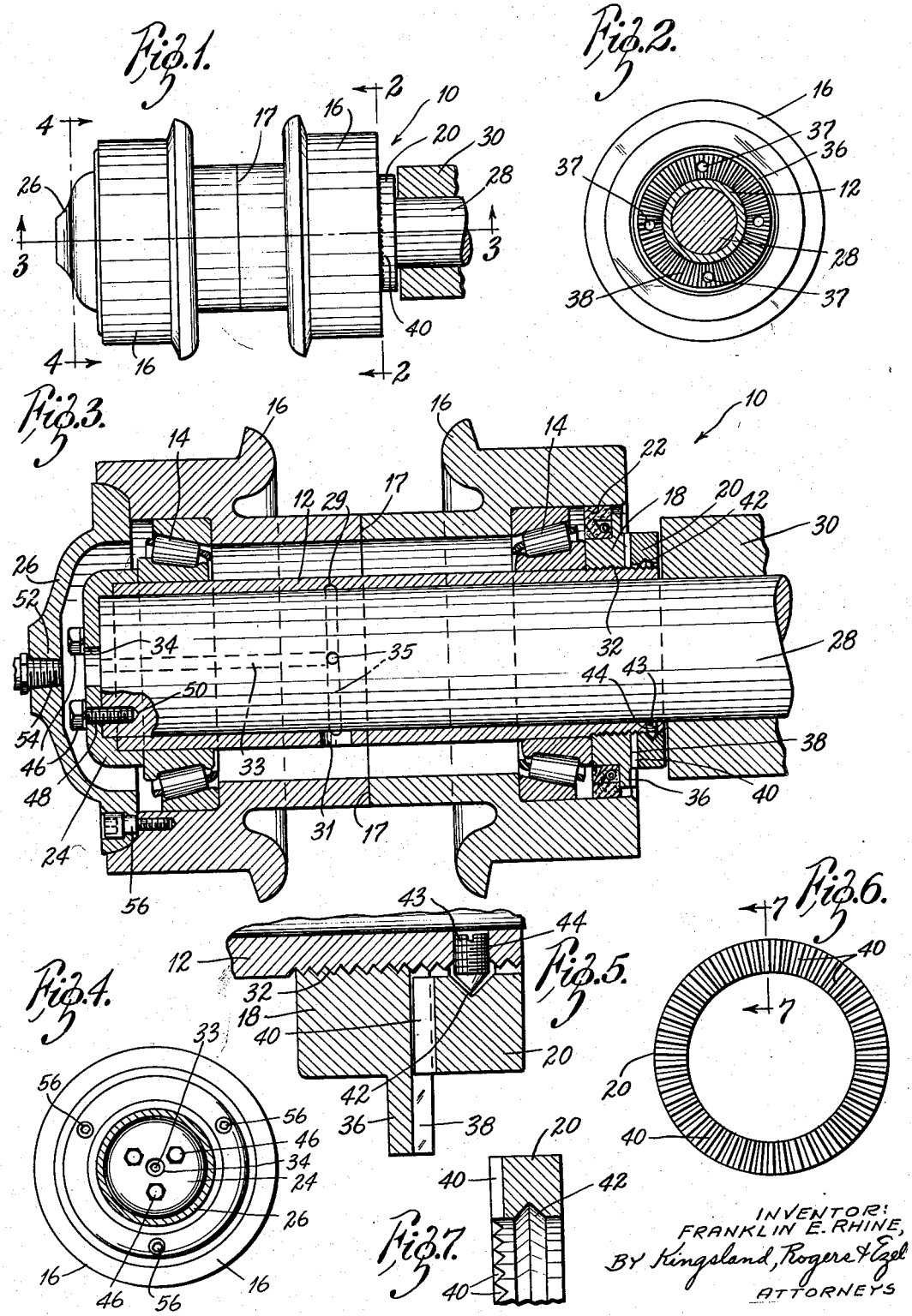

2,666,676

UNITED STATES PATENT OFFICE 2,666,676

IDLER WHEEL UNIT

Franklin E. Rhine, Alton, Ill., assignor to Sterling Steel Casting Co., Monsanto, Ill., a corporation of Illinois Application March 6, 1952, Serial No. 275,072

5 Claims. (Cl. 308—187)

The present invention relates generally to idler wheel constructions, and more particularly to an improved idler wheel unit finding specific adaptation to the support of the upper reach of the continuous tread of a crawler type machine.

There has long existed the need for an idler wheel unit for crawler type machines, such as tractors, which will retain lubrication and will give adequate service under the rugged treatment to which tractors and the like are often subjected. Bogie idlers have been in use for many years, yet, in the wide experience of the applicant, there has never been developed an idler wheel unit which will give the long continuous service which a crawler type machine idler wheel unit should render to keep the machine in operation. Presently used units require frequent addition of lubrication and repair. It is well known that tractors, and the like, are subjected to dust, sand, water, and the ravages of the elements, as in farming, road building, ground clearing, and other rugged services, so that the idler wheel units must be constructed to reduce to a minimum the entry of dust, sand, water, etc., to the interior moving parts and surfaces in order to continue to function as required. The presently disclosed idler wheel unit of the applicant is a solution to the long existing problem.

Briefly, the present novel idler wheel unit includes a sleeve which is secured to a supporting shaft. The sleeve supports a pair of spaced roller bearings each of which, in turn, rotatably supports an idler wheel spaced radially from the sleeve. One end of the unit is closed by a seal and a nut and lock, the latter two members being mounted on the sleeve, and the other end by a hub cap secured to the outer idler wheel. The idler wheels abut in substantially sealing relation, and are firmly forced axially against each other and against adjacent members so that they rotate as a unit.

Therefore, an object of the present invention is to provide a novel idler wheel unit which is constructed for long and continuous rugged service when used as a part of a crawler machine, or other mechanism, and which overcomes the deficiencies existing in heretofore manufactured idler wheel units.

Another object is to provide a novel idler wheel unit which incorporates two abutting idler wheels which are separately supported, but which rotate as a unit.

Another object is to provide a novel idler wheel unit which is assembled in a manner to permit ready disassembly for the replacement of any particular part.

Another object is to provide a novel idler wheel unit which is constructed to reduce to a minimum the entry into the moving parts of destructive foreign matter, and to retain within the unit the lubrication initially packed therein and subsequently added, so that frequent lubrication is eliminated.

Other objects are to provide a novel idler wheel unit which is of rugged construction, which requires a minimum amount of maintenance to keep it in operating condition, which will operate for long periods of time without down time, which is readily adapted to crawler type machines and other mechanisms, and which is otherwise adapted to fulfill the objects and advantages sought therefor.

The foregoing and other objects and advantages are apparent from the following description taken with the accompanying drawing, in which:

Fig. 1 is a side elevational view of an idler wheel unit constructed in accordance with the teachings of the present invention;

Fig. 2 is a vertical transverse cross-sectional view taken on substantially the line 2—2 of Fig. 1;

Fig. 3 is an enlarged horizontal longitudinal cross-sectional view taken on substantially the line 3—3 of Fig. 1;

Fig. 4 is a vertical transverse cross-sectional view taken on substantially the line 4—4 of Fig. 1;

Fig. 5 is an enlarged fragmentary portion of Fig. 3, illustrating portions of the locking member and locking nut;

Fig. 6 is a view of the radially grooved face of the locking nut; and

Fig. 7 is an enlarged cross-sectional view on substantially the line 7—7 of Fig. 6.

Referring to the drawing more particularly by reference numerals, 10 indicates generally an idler wheel unit incorporating the concepts of the present invention. Broadly, the unit 10 includes a supporting sleeve 12, spaced roller bearing assemblies 14 thereon, an idler wheel 16 on each assembly 14, a locking member 18, a cooperating locking nut 20, a sealing member 22, an end cap 24 for the sleeve 12, and a hub cap 26 mounted on the outer idler wheel 16. As illustrated, the unit 10 is mounted on and secured to an axle or shaft 28 which is mounted in a support 30 which may be standard parts of a tractor or other mechanism.

More particularly considering the idler wheel unit 10, the sleeve 12 has threads 32 at one end, and an internal groove 29 and an aperture 31 intermediate the ends. The end cap 24 is shrunk securely onto the other end of the sleeve 12, being of the configuration and cross section shown in Fig. 3 and including a central opening 34 through which lubrication may pass, which is utilized when the axle 28 is provided with axial and radial lubrication passages 33 and 35, respectively, leading to the groove 29 and aperture 31. The end cap 24 engages the sleeve 12 so tightly that there is no relative movement therebetween in the use of the unit 10.

As is clear from Fig. 3, one roller bearing assembly 14 is disposed on the sleeve 12 in abutting relation with the end cap 24, which directly supports for rotation the outer idler wheel 16, preferably of the cross section illustrated for crawler machine use. The other roller bearing assembly 14 is mounted on the sleeve 12 adjacent the other end thereof and directly supports the inner idler wheel 16 identical in cross section with the outer idler wheel 16, except an annular groove in the latter which receives the hub cap 26 is omitted. The two roller bearing assemblies 14 may be Timken bearings of cone type, or other suitable construction. The two idler wheels 16 are machined to provide smooth abutting faces 17 which form an effective seal against loss of lubricant and entry of foreign matter when the unit 10 is adjusted for use, as is detailed below.

The locking member 18 threadedly engages the threads 32 of the sleeve 12 and is in tightly secured abutting relation with the inner roller bearing assembly 14, the locking member 18 including a radial flange 36. Wells 37 are provided in the outer face of the locking member 18 to receive a wrench which is required for rotating the locking member 18 to bring the several elements into firm abutting relation. The sealing member 22 is disposed abut the periphery of the locking member 18 and abuts the radial flange 36 thereof, being forced thereagainst and into the space between the periphery of the flange 36 and the idler wheel 16 by the pressure within the unit 10 to seal this inner end of the unit 10 against the escape of lubricant and to prevent the entry of destructive foreign matter from the outside. The outer face of the locking member 18 is formed as a plurality of radial grooves 38. The locking nut 20, which is of the configuration and cross section shown and includes radial grooves 40 on one face thereof and an internal annular channel 42, is mounted on the inner end of the sleeve 12 with the grooves 40 thereof in engagement with the grooves 38 of the locking member 18. A setscrew 43 is mounted in a threaded aperture 44 in the sleeve 12 and engages the channel 42 of the locking nut 20 (Fig. 5) to prevent rotation of the latter, said setscrew 43 being turned home after the locking nut is rotated into engagement with the locking member 18.

The idler wheel unit 10, less the hub cap 24, assembled as described, is disposed on the axle 28 and is secured thereto by cap screws 46 which extend through openings 48 in the end cap 24 and engage threaded wells 50 in the end of the axle 28, as is clearly shown in Fig. 3. The illustrated axle 28 is a standard part of a tractor.

With the aforesaid elements mounted as described and shown, the hub cap 24, which is of the cross section illustrated in Fig. 3 and includes a threaded central opening 52 closed by a removable threaded lubrication alemite plug 54, or the like, is secured to the outer end of the outer idler wheel 16 by cap screws 56 as shown.

Manifestly, the idler wheels 16 are maintained securely in the positions of Fig. 3 in relation to the sleeve 12, and they rotate together as a unit.

Separate idler wheels 16 are provided for ease and economy of replacement due to wear or breakage. The unit 10 is initially packed with lubricating grease, which may be replenished by pressure insertion through the plug 54, although this replacement operation is required only after long hours of use. Added lubricant will reach both of the roller bearing assemblies 14 from the lubrication plug 54 to maintain them in continuous operation condition, since it will pass between the rollers of the outer assembly 14 and thence to the other assembly 14 and through the opening 34, the passages 33 and 35, the groove 29, and the aperture 31. Loss of lubricant in the unit 10 is so gradual that it is only necessary to add lubricant at widely spaced intervals, thereby saving time in the use of the crawler type or other machine on which it is mounted. Furthermore, this factor insures continued lubrication within the unit 10 and substantially eliminates internal freezing which often arises in idler wheel units presently employed.

When the unit 10 is mounted upon a tractor, or the like, on the shaft 28 which is supported by the portion 30 of the tractor, it is, of course, understood that it is disposed in position to support the upper reach of the continuous track.

It is manifest that there has been provided an idler wheel unit which overcomes the disadvantages found in presently used units, and fulfills the objects and advantages sought therefor.

It is to be understood that the foregoing description and the accompanying drawing have been given by way of illustration and example. It is also to be understood that changes in form of the elements, rearrangement of parts, and substitution of equivalent elements, which will be obvious to those skilled in the art, are contemplated as within the scope of the present invention which is limited only by the claims which follow.

What is claimed is:

1. An idler wheel unit comprising a sleeve adapted for mounting on a support, spaced roller bearing assemblies mounted on said sleeve, a member secured to one end of said sleeve, one roller bearing assembly being disposed against said member as a stop, an idler wheel rotatably mounted on each roller bearing assembly and in abutting relation, said idler wheels being spaced radially from said sleeve and defining a lubrication space therewith, a locking member threadedly engaging said sleeve and disposed in abutting relation to said other roller bearing assembly maintaining said roller bearing assemblies and said idler wheels on said sleeve, means maintaining said locking member against removal, said locking member closing one end of said lubrication space, and means closing the other end thereof, said last-mentioned means comprising a cap member secured to one of said idler wheels and spanning the end of said lubricating space and said idler wheel stop member.

2. An idler wheel unit comprising a sleeve adapted for mounting on a support, spaced roller bearing assemblies mounted on said sleeve, a member secured to one end of said sleeve, one roller bearing assembly being disposed against said member as a stop, an idler wheel rotatably mounted on each roller bearing assembly and in abutting relation, said idler wheels being spaced radially from said sleeve and defining a lubrication space therewith, a locking member threadedly engaging said sleeve and disposed in abutting relation to said other roller bearing assembly maintaining said roller bearing assemblies and said idler wheels on said sleeve, means maintaining said locking member against removal, said locking member closing one end of said lubrication space, and means closing the other end thereof, said last-mentioned means comprising a cap member secured to one of said idler wheels and spanning the end of said lubricating space and said idler wheel stop member, and means for injecting lubrication into said lubrication space to replenish a diminishing supply.

3. An idler wheel unit comprising a sleeve adapted for mounting on a concentric shaft as a support, spaced roller bearing assemblies mounted on said sleeve, a member secured to one end of said sleeve, means for securing said member and therethrough said sleeve to the end of a supporting concentric shaft in fixed relation thereto, one roller bearing assembly being disposed against said member as a stop, an idler wheel rotatably mounted on each roller bearing assembly and in abutting relation, a locking member threadedly engaging said sleeve and disposed in abutting relation to said other roller bearing assembly maintaining said roller bearing assemblies and said idler wheels on said sleeve, and means maintaining said locking member against removal.

4. An idler wheel unit comprising a sleeve adapted for mounting on a support, spaced roller bearing assemblies mounted on said sleeve, a member secured to one end of said sleeve, one roller bearing assembly being disposed against said member as a stop, an idler wheel rotatably mounted on each roller bearing assembly and in abutting relation, a locking member threadedly engaging said sleeve and disposed in abutting relation to said other roller bearing assembly maintaining said roller bearing assemblies and said idler wheels on said sleeve, said locking member having radial grooves in the outwardly faced side, means maintaining said locking member against removal including a locking nut having radial grooves in one face engaging said radial grooves of said locking member, and means securing said locking nut against removal.

5. An idler wheel unit comprising a sleeve adapted to be mounted upon a support, spaced roller bearing assemblies mounted on said sleeve, idler wheels rotatably mounted on said roller bearing assemblies in spaced relation to said sleeve, said idler wheels and said sleeve defining a lubricating space, means disposed on one end of said sleeve locking an adjacent roller bearing assembly against removal and substantially preventing escape of lubrication, and means closing the unit at the other end of said sleeve comprising a cap member secured to the adjacent idler wheel and spanning the end of the sleeve and the idler wheel supporting bearing assembly.

FRANKLIN E. RHINE.

References Cited in the file of this patent

UNITED STATES PATENTS

| Number | Name | Date |
|---|---|---|
| 1,778,060 | Briggs | Oct. 14, 1930 |
| 2,155,916 | Weckstein | Apr. 25, 1939 |
| 2,283,871 | Norelius | May 19, 1942 |